United States Patent [19]

Song

[11] Patent Number: 4,892,775

[45] Date of Patent: Jan. 9, 1990

[54] JET INK FOR VINYL SUBSTRATE MARKING

[75] Inventor: Il H. Song, Glen Ellyn, Ill.

[73] Assignee: Videojet Systems International, Inc., Elk Grove Village, Ill.

[21] Appl. No.: 293,369

[22] Filed: Jan. 4, 1989

Related U.S. Application Data

[62] Division of Ser. No. 113,792, Oct. 27, 1987, Pat. No. 4,834,797.

[51] Int. Cl.⁴ .............................................. B32B 9/00
[52] U.S. Cl. .................................. 428/195; 428/207; 428/518; 428/520; 106/20; 106/22; 260/DIG. 38; 524/364; 524/555
[58] Field of Search ............... 428/195, 500, 207, 518, 428/520; 106/20, 22; 260/DIG. 38; 524/364, 555

[56] References Cited

U.S. PATENT DOCUMENTS 4,246,154  1/1981  Yao ....................................... 524/88
4,623,689  11/1986 Shintani et al. ...................... 524/457

Primary Examiner—Ellis P. Robinson
Assistant Examiner—P. J. Ryan
Attorney, Agent, or Firm—Leydig, Voit & Mayer

[57] ABSTRACT

An ink composition for use in ink jet printing to print images on a vinyl substrate which contains vinyl polymers and plasticizers, the composition being formulated to include a resin component having a pendant amino group, a dye, and a carrier. The composition can be applied to vinyl substrates without fading with time, due to degradation of the printed images by plasticizers present in the vinyl substrate.

2 Claims, No Drawings

JET INK FOR VINYL SUBSTRATE MARKING

This is a division of application Ser. No. 113,792 filed Oct. 27, 1987 now U.S. Pat. No. 4,834,797.

BACKGROUND OF THE INVENTION

This invention generally relates to the field of ink jet printing. In particular, this application relates to ink compositions for ink jet printing onto plasticized vinyl substrates and to the resultant printed articles.

Ink Jet printing is a well known technique by which printing is effected without contact between the printing device and the substrate on which the printed characters are deposited. Describing briefly one technique for doing ink jet printing, a stream of droplets of ink are projected toward a surface and the trajectories of the droplets are controlled electronically so that the droplets are caused to form the desired printed image on a relatively movable substrate. Another technique of ink jet printing is to direct droplets on demand from a set of orifices at a relatively moving substrate. Such non-contact ink jet printing techniques are particularly well suited for application of characters onto irregularly shaped surfaces.

In general, ink jet printing techniques impose rigid requirements on the ink compositions. To be suitable for use as a jet ink, the compositions must meet some or all of the requirements of viscosity, resistivity, solubility, compatibility of components and wetability of the substrate. The ink must be quick drying and smear resistant and capable of passing through the ink jet nozzle without clogging. The ink should also permit rapid cleanup of the machine components with minimum effort.

Many ink jet printing compositions contain a carrier and a dye which is soluble or dispersible in that carrier, as well as evaporation retardants to control evaporative losses from the system, resistivity control agents to adjust the electrical resistivity of the ink and other conventional components. For many applications, the jet ink composition also contains a binder component such as a vinyl acetate copolymer to improve adhesion between the printed image and the substrate on which the printing is effected. A variety of such resin binders have been employed, as described in U.S. Pat. Nos. 4,210,566, 4,260,531, 4,567,213 and 4,070,322. In practice, ink jet printing is applied to several different types of substrates, such as paper, glass, metal, and plastic.

Unfortunately, it has been found that although prior jet ink compositions containing resin binders have been generally suitable for jet printing onto most substrates, a problem has existed when the substrate is of the vinyl polymer type, containing one or more plasticizers. In such an instance, the quality of printed characters made with the prior art ink compositions has been found to deteriorate with the passage of time. This deterioration problem is of particular concern, as one of the important commercial applications for ink jet printing is the coding of insulated wires. Ink jet printing is particularly well suited to such an application because the irregularities of the surface of the insulating coating on the wires make it difficult, if not impossible, to employ conventional printing techniques. However, the insulating coating on the wires commonly is of the plasticized vinyl polymer type. Because of the aforementioned deterioration of the printed images made with prior art inks, such compositions when printed onto the insulated wires have produced unsatisfactory results. Apparently, an interaction exists between the plasticizer for the vinyl coating and the printed image which causes the printed image to fade with time to the point that it eventually becomes illegible.

Thus, a need has existed in the art for an ink composition which is suitable for ink jet printing onto plasticized vinyl substrates, such as those used to insulate wires, to form printed images that are stable.

It is, therefore, an object of the present invention to provide an ink composition which overcomes the deterioration problem associated with the use of prior jet ink formulations when applied to plasticized vinyl substrates. Specifically, a principal object of the present invention is to provide an ink composition suitable for ink jet printing onto vinyl polymer substrates, which is able to produce printed images which resist fading caused by interaction with the plasticizer in the vinyl substrate. The foregoing and other objects of the invention will be apparent from the following description of the present invention.

SUMMARY OF THE INVENTION

An improved fade-resistant ink composition suitable for ink jet printing onto vinyl polymer substrates is now provided. Surprisingly, it has been discovered that by using an acrylic resin binder component having pendant amino groups in the ink formulation the problem of fading or deterioration of printed images is overcome.

In accordance with the present invention there is provided an ink composition suitable for ink jet printing onto plasticized vinyl polymer type substrates. The ink composition comprises an acrylic resin binder component having pendant amino groups, a carrier in which the acrylic resin binder is soluble and a dye which is soluble or dispersible in the carrier.

The present invention also provides plasticized vinyl articles which comprise a vinyl layer containing a vinyl polymer and at least one plasticizer for the polymer on which images have been printed by non-contact application of an ink having the composition described previously.

DETAILED DESCRIPTION OF THE INVENTION

As described hereinabove, the ink composition of the present invention comprises an acrylic resin binder component having pendant amino groups, a carrier in which the binder is soluble, and a dye which is soluble or dispersible in the carrier.

The resin binder which is useful in the composition of the present invention is not critical and any acrylic resin binder is satisfactory, so long as it has pendant amino groups. Although the exact mechanism is not understood, the pendant amino groups in some fashion impart stability to the composition with respect to degradation caused by interaction of the ink with vinyl plasticizers. The amino group may be a primary, a secondary, or a tertiary amine group and the nature of the substituents on the amine group is not critical. Substituents such as methyl, ethyl, and propyl are typical. Preferably the amine group is a tertiary amine and most preferably the amine group is dimethyl substituted.

The resin binders useful in the practice of the present invention preferably are comprised of acrylic or methyacrylic monomer units in combination with acrylic or methacrylic monomer units which contain a pendant amino group. The monomers typically are esters of acrylic or methacrylic acid, such as methyl, ethyl, butyl or 2-ethylhexyl esters of acrylic or methacrylic acids and the monomers containing the pendant amino group likewise are typically esters of acrylic or methacrylic acid with an amino substituted group. Usually the amino substituted group will be a methyl, ethyl, butyl or 2-ethylhexyl group which has been amino substituted. Most preferably, the amino containing monomer is dimethyl amino ethyl methacrylate.

In the resin binders useful in the practice of the present invention the specific amount of pendant amino groups is not critical and can, of course, be controlled by varying the weight ratio of the monomer units containing the pendant amino groups to the monomers which do not contain the pendant amino groups. Broadly, the ratio of monomers containing amino groups to monomers not containing amino groups can vary from about 10:1 to about 1:10. Preferably, that ratio will be from about 4:1 to about 1:4 and most preferably about 3:7.

The amount of resin binder in the compositions of the present invention is not critical and may be varied from about 5 to about 20 percent (based on the solid content of the resin binder), by weight based upon the total weight of the composition. Preferably, the amount of resin binder will be from about 9 to about 12 percent and most preferably from about 9 to about 10 percent.

A variety of carriers may be utilized. The principal carrier is typically a mixture of a lower alcohol and a lower ketone, each preferably having less than 10 carbon atoms. An alcohol which typifies those that are useful is methyl alcohol. Useful ketones in the present invention include aliphatic ketones having up to about 10 carbon atoms in straight or branched chain arrangement, such as acetone, methyl ethyl ketone, methyl isobutyl ketone or an alicyclic ketone, such as cyclopentanone, cyclohexanone, or other alicyclic ketones having up to 10 carbon atoms. The amount of carrier employed usually is in the range of about 40 to about 90 percent by weight of the composition, and in the preferred practice is in the range of about 65 to about 85 percent by weight of the composition.

Suitable dye-stuff components are those which are soluble or dispersible in the solvent and include solvent black 7 and solvent blue 36 dyes. Preferred solvent black 7 dyes are typically selected from such dyes such as ATLASOL spirit nigrosine B base. One skilled in the art will be able to ascertain other such operable dyes through reference to information as contained in the *Color Index Guide*. The amount of dye employed in the practice of the invention is not critical and can be varied within relatively broad ranges. In general, the dyes are present in the composition in amounts varying from about 0.5 to about 5 percent and preferably from about 1.5 to about 2.5 percent, based on the weight of the ink compositions.

Suitable conductivity control components which optionally may be present include, among others, soluble ionizable salts such as alkali metals and alkaline earth metal halides, nitrates, thiocyanates, acetates, propionates, and amine salts. An example of such salts is lithium nitrate. The salts are typically used in an amount of 0.1 to about 2 percent by weight of the composition and preferably from about 0.3 to about 0.8 percent by weight.

While not essential to the practice of the present invention, the ink composition of this invention can also be formulated to include evaporation retardants for the purpose of retarding evaporation of the solvents. Such retardants are conventional in ink jet printing compositions. Typical evaporation retardants include glycol ethers, a glycol ester or combinations thereof. Especially preferred is diethylene glycol monoethyl ether. The evaporation retardant typically is present in an amount up to about 10 percent by weight based on the weight of the composition, and preferably from about 2 to about 4 percent by weight.

As will be appreciated by those skilled in the art, the ink composition of the present invention also may be formulated to include one or more surfactants to impart desirable characteristics to the liquid ink composition. Preferred surfactants include non-ionic surfactants such as fluorinated alkyl esters such as FLUORAD FC 430 TM.

In general, the inks of the present invention exhibit the following characteristics for use in ink jet printing systems: (1) a viscosity from about 1.6 to about 7 centipoises (cps) at 25° C., (2) an electrical resistivity from about 50 to about 2,000 ohms-cm, (3) a sonic velocity from about 1,200 to about 1,700 m/s, and (4) a surface tension below 35 dynes/cm.

Having described the basic concepts of the invention, reference is now made to the following non-limiting Examples which are illustrative of ink compositions according to the present invention which are effective in ink jet printing onto vinyl polymer type substrates and also are resistant to degradation by plasticizers in the substrate.

COMPARATIVE EXAMPLE A

A commercially available ink composition was obtained from Video Jet Systems. The ink jet formulation contained as the binder a vinyl resin sold under the trademark BAKELITE VMCH TM which is a terpolymer of vinylchloride, vinyl acetate, and maleic anhydride. That composition was applied to a vinyl substrate using typical ink jet printing to vinyl coated wires. Upon storage, the following results were obtained: The printed code almost completely faded after two weeks of storage at room temperature, and after 20 hours in a Fadeometer (Atlas Electric).

COMPARATIVE EXAMPLE B

A commercially available ink composition for use in ink jet printing was obtained. The composition contained as the binder component a resin sold under the trademark JONCRYL TM which is a copolymer of a methacrylic or acrylic ester and acrylic acid. That ink composition was applied using standard ink jet printing to vinyl coated wires. Upon storage the following results were obtained: The code completely faded after one month storage at room temperature, and after 70 hours in a Fadeometer.

EXAMPLE 1

A polymer useful in the practice of the present invention as a binder component in a jet ink solution was made by polymerizing 378 grams of methyl methacrylate (3.78 mole) and 162 grams of dimethylaminoethyl methacrylate (1.03 mole) in 990 grams of methyl ethyl ketone, in the presence of 2.7 grams of n-dodecyl mercaptan and 3.7 grams of azobisisobutyronitrile, initiator at 70° C. The polymer as a 35%, by weight, solution in methyl ethyl ketone was then mixed with other formulation components in the following weight proportions:

| Composition | % By Weight |
|---|---|
| Methyl Ethyl Ketone | 23.0 |
| Polymer Solution (35% in methyl ethyl ketone) | 27.0 |
| Diethylene Glycol Monoethyl Ether | 5.0 |
| Solvent Black 7 | 1.5 |
| Fluorad FC 430 (10%) | 0.8 |
| Lithium Nitrate | 0.7 |
| Deionized Water | 1.0 |
| Methyl Alcohol | 40.5 |
| N—ethyl o,p-toluenesulfonamide | 0.5 |
| | 100.0 |

The resulting ink composition was printed onto vinyl jacketed wires. The ink had excellent adhesion to the vinyl jacketed wires and the printed characters remained unaffected by the plasticizers. In addition, the printed characters showed very little color change after storage for one month in a 125° F. oven or after 200 hours of fadeometer exposure. A fadeometer exposure of 400 hours showed a slight color change but the images were still readable.

EXAMPLE 2

The polymer of Example 1 was used to make an ink formulation, in combination with the components, and in the weight proportions, shown below. In this example propylene glycol methyl ester was used instead of diethylene glycol monoethyl ester as an evaporation retardant, and a higher ratio of ketone to alcohol was employed in the carrier.

| Composition | % By Weight |
|---|---|
| Methyl Ethyl Ketone | 37.3 |
| Polymer Solution (35% in MEK) | 27.0 |
| Propylene Glycol Methyl Ether | 8.0 |
| Solvent Black 7 | 1.5 |
| Fluorad FC 430 (10%) | 0.8 |
| Lithium Nitrate | 0.4 |
| Deionized Water | 1.0 |
| Methyl Alcohol | 23.5 |
| N—ethyl o,p-toluenesulfonamide | 0.5 |
| | 100.0 |

The resulting ink was printed onto many vinyl jacketed wires containing different plasticizers. The printed inks were tested in a 125° F. oven for two months or under fluorescent light at room temperature for four months and showed no change in readability. A fadeometer test of 400 hours likewise showed very little color change.

EXAMPLE 3

The polymer of Example 1 was used to make an ink formulation, in combination with the components, and in the amounts specified below. In this Example, dimethylamine hydrochloride was used, rather than the lithium nitrate used in Examples 1 and 2, and a higher ratio of ketone to alcohol was employed than in Example 2, along with a higher water content.

| Composition | % By Weight |
|---|---|
| Methyl Ethyl Ketone | 58.2 |
| Methyl Alcohol | 7.0 |
| Deionized Water | 4.2 |
| Fluorad FC 430 (10%) | 0.8 |
| Diethylene Glycol Monoethyl Ether | 2.7 |
| Dimethyl Amine Hydrochloride | 0.6 |

| Composition | % By Weight |
|---|---|
| Polymer Solution (35% in MEK) | 27.0 |
| Solvent Black 7 | 1.5 |
| | 100.0 |

The printed code had similar lightfastness properties as shown in Examples 1 and 2.

EXAMPLE 4

The polymer of Example 1 was used to make an ink formulation, in combination with the components, and in the amounts specified below. This example is essentially identical to that of Example 3 except that Keyplast Blue A was used in place of Solvent Black 7 as the dye and lithium nitrate was used in place of the dimethylamine hydrochloride.

| Composition | % By Weight |
|---|---|
| Methyl Ethyl Ketone | 54.0 |
| Methyl Alcohol | 7.0 |
| Deionized Water | 4.6 |
| Fluorad FC 430 (10%) | 0.8 |
| Diethylene Glycol Monoethyl Ether | 3.5 |
| Lithium Nitrate | 1.6 |
| Polymer Solution (35% in MEK) | 27.0 |
| Keyplast Blue A | 1.5 |
| | 100.0 |

The printed code had only a slight color change after 3 months of room temperature storage, and after 280 hours of Fadeometer exposure.

EXAMPLE 5

The effect of plasticizer attack on the amino group containing acrylic polymer composition was studied as follow. By weight, 90/10, 80/20, 70/30 and 60/40 methyl methacrylate (MMA)/dimethylaminoethyl methacrylate (DAM) copolymers were prepared according to the procedure given in Example 1.

Polymer films were cast on aluminum panels using wire-wound rod. Many different vinyl plasticizers were deposited on the films, and then the attack of the plasticizers on the film was observed. The results are shown below:

| Polymer Composition | Plasticizers Attack |
|---|---|
| 90/10 MMA/DAM | Attacked |
| 80/20 MMA/DAM | Attacked (some) |
| 70/30 MMA/DAM | No Attack |
| 60/40 MMA/DAM | No Attack |

It will be understood that changes may be made in the details of formulation of the ink composition without departing from the spirit of the invention, especially as defined in the following claims.

What is claimed is:

1. A plasticized vinyl article comprising
   (a) a vinyl layer which contains a vinyl polymer and at least one plasticizer for said polymer; and
   (b) images printed on said layer by non-contact, ink jet application of an ink having a composition comprising an acrylic resin binder component having pendant amino groups, said binder being soluble in, and dissolved by, a mixture of a lower alkanol and a lower ketone; a carrier comprising a lower alkanol and a lower ketone in which the acrylic resin binder is soluble; and a dye which is soluble or dispersible in said carrier; the images being stable against degradation by the plasticizer contained in said vinyl coating.

2. A plasticized vinyl article comprising:
(a) A vinyl layer which contains a vinyl polymer and at least one plasticizer for said polymer;
(b) Images printed on said layer by non-contact, ink jet application of an ink having a composition comprising an acrylic resin binder component having at least one pendant amino group; a carrier in which said acrylic resin binder is soluble, comprising a lower alkanol and a lower ketone; a dye soluble or dispersible in said carrier; a conductivity control component comprising a soluble ionizable salt; and an evaporation retardant selected from the group consisting of glycol ethers; the images being stable against degradation by the plasticizer contained in said vinyl coating.

* * * * *